United States Patent
Moliton (10) Patent No.: US 8,330,672 B2
(45) Date of Patent: Dec. 11, 2012

(54) OPTO-ELECTRONIC DISPLAY ASSEMBLY

(75) Inventor: Renaud Moliton, Charenton-le-Pont (FR); Cécile Bonafos, legal representative, Paris (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 519 days.

(21) Appl. No.: 12/515,821

(22) PCT Filed: Nov. 16, 2007

(86) PCT No.: PCT/FR2007/052357
§ 371 (c)(1),
(2), (4) Date: Jan. 13, 2010

(87) PCT Pub. No.: WO2008/062129
PCT Pub. Date: May 29, 2008

(65) Prior Publication Data
US 2012/0249408 A1 Oct. 4, 2012

(30) Foreign Application Priority Data
Nov. 23, 2006 (FR) ..................... 06 55070

(51) Int. Cl.
*G09G 5/00* (2006.01)
(52) U.S. Cl. ........................... 345/7; 345/1.1
(58) Field of Classification Search ............... 345/1.1, 345/1.2, 2.2, 4, 7, 8
See application file for complete search history.

(56) References Cited

U.S. PATENT DOCUMENTS

| | | | |
|---|---|---|---|
| 7,825,996 B2* | 11/2010 | Yamada et al. | 348/744 |
| 2004/0130783 A1* | 7/2004 | Solomon | 359/462 |
| 2005/0097179 A1* | 5/2005 | Orme | 709/207 |
| 2006/0033992 A1* | 2/2006 | Solomon | 359/462 |
| 2006/0072215 A1* | 4/2006 | Nishi | 359/708 |

* cited by examiner

*Primary Examiner* — Ricardo L Osorio
(74) *Attorney, Agent, or Firm* — Sofer & Haroun, LLP (57) ABSTRACT

An electronic display arrangement for taking light signals forming an image emitted from a miniature screen (2) and referred to as a screen image, and for conveying them to the eye (O) of a user to enable a virtual image (I) to be viewed, the arrangement having a miniature screen control device having an arrangement for subdividing a source image into N screen images ($I_E$) and in that it includes a mosaicing device (3) having an exit viewport (10) and serving to convey the N screen images in a manner in which they are spatially offset from one another and time shifted from one another at a period (τ) shorter than the remanence time of the retina of the eye divided by N, each screen image ($I_E$) being conveyed towards the eye of the wearer for viewing a virtual sub-image ($I_N$), the N resulting and adjacent virtual sub-images together forming said virtual image (I) in full, said mosaicing device (3) being constituted by a light polarization control element (5) and by an element (7) for spatially reconstructing the virtual image (I). A mosaicing device has a light pipe (6) of material that is transparent in the visible domain and said light pipe is disposed between said control element (5) and said element for spatially reconstructing the virtual image.

18 Claims, 9 Drawing Sheets

OPTO-ELECTRONIC DISPLAY ASSEMBLY

RELATED APPLICATIONS

This application is a National Phase application of PCT/FR2007/052357, filed on Nov. 16, 2007, which in turn claims the benefit of priority from French Patent Application No. 06 55070, filed on Nov. 23, 2006, the entirety of which are incorporated herein by reference

FIELD OF THE INVENTION

The invention relates to an opto-electronic display arrangement mounted on a frame of the type suitable for a pair of eyeglasses.

The invention relates to an opto-electronic display arrangement designed to take light signals forming an image emitted from a miniature screen and referred to as a screen image, and to convey them towards the eye of a user to enable a virtual image to be viewed.

BACKGROUND OF THE INVENTION

One such arrangement is described in patent document U.S. Pat. No. 7,068,404.

That document describes a thin light guide using a hologram and a prismatic lens serving to magnify the size of the miniature screen and project a virtual image thereof in front of the wearer's eye.

Another type of prior art arrangement is described in patent document EP 1 566 682.

That document describes a beam-expanding light guide that is even thinner than that of the preceding prior art, and it likewise describes an optical system capable of projecting the image of a miniature screen to infinity.

The common point of those systems is that the major part of the optical power for magnifying the image of the miniature screen is located outside the light guide. In those arrangements, fields of view of the order of 15° to more than 30° can be achieved, while retaining light guide thicknesses that are small.

Nevertheless, in order to obtain such fields of view of more than 20°, present arrangements include optical systems and miniature screens that are of relatively large volume given that since the size of the miniature screen is an important factor in dimensioning the size of the associated optical systems. The opto-mechanical assembly that is needed is found to be too large compared with the waveguide thickness that it is desired to make as small and fine as possible, so as to enable it to be incorporated in an ophthalmic lens, for example.

Patent document US 2001/0048554 discloses an electronic display arrangement for taking light signals forming an image emitted from a miniature screen and, referred to as a screen image, and for conveying them towards the eye of a user to enable a virtual image to be viewed.

That arrangement includes a miniature screen control device having an arrangement for subdividing a source image into two screen images, and a mosaicing device having an exit viewport and serving to convey the screen images in a manner in which they are spatially offset from each other and time shifted from each other, at a period of less than 25 milliseconds (ms).

Each screen image is conveyed towards the eye of the wearer so as to enable a virtual sub-image to be viewed, the two resulting and adjacent virtual sub-images together forming said virtual image in full.

OBJECT AND SUMMARY OF THE INVENTION

The object of the invention is to provide an opto-mechanical assembly for generating a virtual image in front of the eyes of the wearer and that is of smaller size, with this being achieved by means of a miniature screen that is likewise of relatively smaller size, while nevertheless ensuring an extended field of view, greater than 20°.

To do this, the invention provides an electronic display arrangement for taking light signals forming an image emitted from a miniature screen and referred to as a screen image, and for conveying them to the eye of a user to enable a virtual image to be viewed, the arrangement being characterized in that it includes a miniature screen control device having an arrangement for subdividing a source image into N screen images and in that it includes a mosaicing device having an exit viewport and serving to convey the N screen images in a manner in which they are spatially offset from one another and time shifted from one another at a period shorter than the remanence time of the retina of the eye divided by N, each screen image being conveyed towards the eye of the wearer for viewing a virtual sub-image, the N resulting and adjacent virtual sub-images together forming said virtual image in full, said mosaicing device being constituted by a light polarization control element and by an element for spatially reconstructing the virtual image, the arrangement being characterized in that said mosaicing device comprises a light pipe of material that is transparent in the visible domain and in that said light pipe is disposed between said control element and said element for spatially reconstructing the virtual image.

The presence of the light guide makes it possible to shorten the optical path length and thus to make the system more compact.

The light pipe may be disposed between said miniature screen and the first polarization control device or between the polarization control element and the element for spatially reconstructing the image.

Preferably, said light pipe is disposed between said control element and said element for spatially reconstructing the image.

Preferably, said mosaicing device is disposed between said miniature screen and the eye of the wearer.

Advantageously, said element for spatially reconstructing the image comprises at least two mirrors each offset in a different position relative to a reference optical axis defined as being the straight line from the center of said miniature screen and perpendicular to the plane of said screen, at least one polarization separating treatment, and at least two quarter-wave plates.

Said element for spatially reconstructing the image may be made up of a set of prisms and/or rhombohedra, spherical or aspherical mirrors each offset in a different position relative to the reference optical axis, polarization separating treatments, grid polarizers, and quarterwave or halfwave plates.

Advantageously, at least one of said polarization separating treatments is a grid polarizer.

Advantageously, said element for spatially reconstructing the image has as many offset spherical or aspherical mirrors as there are sub-images, i.e. N mirrors.

Advantageously, these spherical or aspherical mirrors are mirrors of the Mangin type.

Alternatively, a second element for controlling polarization may be added to the mosaicing device and positioned on the path of the light beams immediately after the element for spatially reconstructing the image.

Preferably, at least one pupil-extending light guide including an entry viewport is placed between the mosaicing system and the eye of the wearer.

The light guide may be made a material that is transparent in the visible domain.

Said light guide may be included in an ophthalmic lens.

And the exit viewport from the mosaicing system may be placed in correspondence with the entry viewport of the light guide.

The light guide may be disposed between the element for spatially reconstructing the image and the eye of the user.

In a preferred embodiment, N is equal to two and said polarization control element polarizes the light beams coming from the miniature screen alternately with a P polarization vector and an S polarization vector, substantially at said period.

Advantageously, said light pipe may take the form of a rhombohedron having at least one of its faces possessing an optical function within the element for spatially reconstructing the image.

Preferably, said light pipe carries inclined polarization separating treatment associated with two quarterwave plates with delay axes forming an angle of 45° relative to the direction of the P or S polarization vector in the plane of said quarterwave plates.

Advantageously, the separating treatment is inclined at 45° relative to a reference optical axis defined as being the straight line from the center of said miniature screen and perpendicular to the plane of said screen, and the two quarterwave plates are perpendicular.

Preferably, said polarization control element comprises an electrically-controlled liquid crystal cell.

Said miniature screen and said polarization control element may form a single part.

Said virtual sub-images may be of an interlaced configuration.

Under such circumstances, and preferably, said polarization control element may have interlaced electrodes.

Advantageously, the miniature screen control device includes a device for resetting the positions of said screen images, said resetting being defined by calibration on an adjustment bench.

Said miniature screen may present a zone containing pixels displaying an image that is of a size greater than the size of the screen image that is generated thereon.

The miniature screen control device may include an arrangement for addressing said screen images.

Advantageously, a device for storing resetting coordinates in memory possesses redundancy and an error correction system.

BRIEF DESCRIPTION OF THE DRAWINGS

The invention is described below in greater detail with the help of figures that merely show a preferred embodiment of the invention.

FIG. 3A shows traces in the path referred to as the PS path because it corresponds to selecting P polarization and then transforming it into S polarization on exit from the mosaicing device.

FIG. 3B shows traces in the path referred to as the SP path because it corresponds to selecting S polarization and then transforming into P polarization on exit from the mosaicing device.

DETAILED DESCRIPTION

Figure 1:
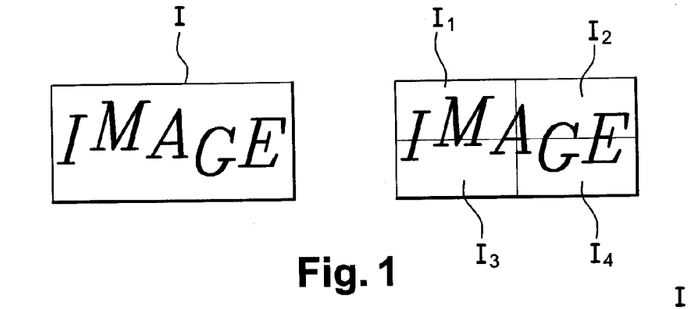
FIG. 1 shows the mosaicing principle of the invention.

The mosaicing principle is shown in FIG. 1 and consists in recreating an image of large size from smaller individual sub-images. In order to enable a virtual information image I of large size to be viewed, the invention proposes displaying N virtual sub-images, here four sub-images $I_1$ to $I_4$ that are adjacent and that together form the virtual image I in full.

Figure 2A:
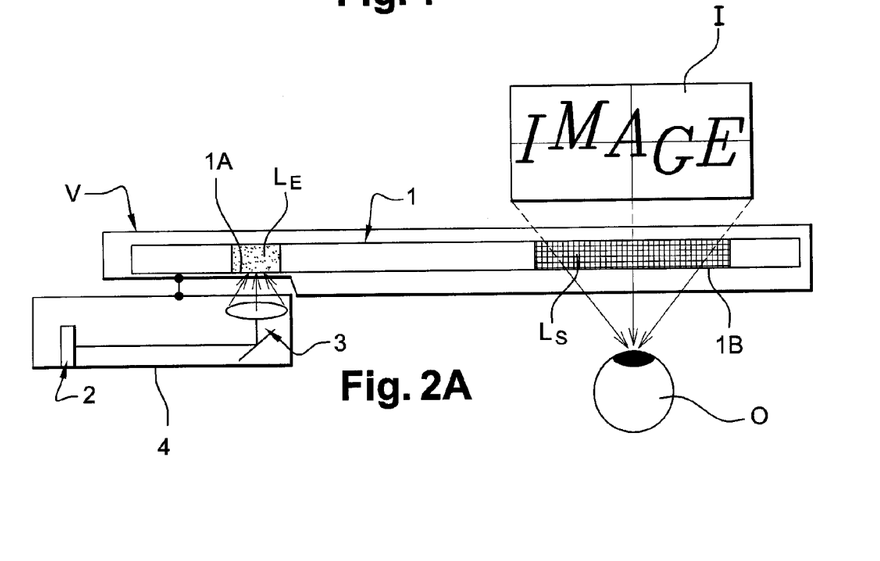
FIG. 2A is a plan view of a display in accordance with the invention.

To do this, the invention proposes a display arrangement as described in FIG. 2A.

This opto-electronic display arrangement includes a light guide 1 for taking light signals forming an image emitted by a miniature screen 2, and referred to as the screen image, and for conveying them from one of its ends referred to as an entry surface 1A to its other end referred to as an exit surface 1B, for forwarding to the eye of a user in order to view a virtual image I.

The invention applies to any opto-electronic display of this type that includes an arrangement for expanding a light beam, regardless of whether or not the arrangement includes such a light pipe.

A device for controlling the miniature screen 2 includes an arrangement for subdividing a source image as supplied by a source such as a video reader, for example, into N screen sub-images, and it includes a "mosaicing" device 3 for delivering these N screen sub-images in mutually offset manner at a-period $\tau$ that is shorter than the remanence time of the retina of the eye divided by N, each screen image being conveyed to the eye of the wearer for viewing a virtual sub-image $I_N$, with the N resulting virtual sub-images being adjacent to one another and together forming the virtual image I in full. The mosaicing device 3 is disposed between the miniature screen 2 and the light pipe 1.

The light pipe 1 is of the exit pupil expander type and includes an entry viewport or pupil $L_E$ corresponding to the entry surface of the pipe and constituted by the entry zone for coupling light beams emitted by the mosaicing device, and an exit viewport of pupil $L_S$ located facing the eye of the wearer.

This pupil-expander pipe may be included in an eyeglass lens V.

The miniature screen 2 and the mosaicing optical device 3 are preferably contained in a housing 4 connected to the eyeglass lens, e.g. by a releasable connection arrangement using snap-fastening.

There is a direct relationship between the number of pixels on the miniature screen 2 and the number of pixels in the total virtual image I.

Let NIv and NIh be the numbers of pixels in the image in the vertical direction, equal to the number of rows, and in the horizontal direction, equal to the number of columns;

let NDv and NDh be the numbers of pixels of the miniature screen in the vertical direction equal to the number of rows, and in the horizontal direction equal to the number of columns;

there exist two integers Kv and Kh such that:

$$NIv = Kv \times NDv$$

$$NIh = Kh \times NDh$$

$$Kh \times Kv = NT.$$

The more highly mosaiced direction of the image is the direction in which the number of partitions is the greater. It is horizontal if Kh>Kv, vertical if Kv>Kh, and neutral if Kh=Kv.

In general, for systems with temporal geometry, it is more advantageous to have a horizontal mosaicing direction. For systems with insertion from above, it is more advantageous to have a vertical mosaicing direction.

These images are displayed sequentially in time. For example, in FIG. 1, in order to display an overall image I, the sub-image $I_1$ is displayed first, then the sub-image $I_2$, then the sub-image $I_3$, and finally the sub-image $I_4$; thereafter the second overall image begins by displaying new sub-images in the same sequence.

For N being the number of sub-images $I_N$ making up the total image I, in order to ensure that from the point of view of the user only one image is perceived by the brain, it is necessary for the overall image to be refreshed at a frequency that is greater than the refresh frequency $F_0$ of retina receptors, i.e. 25 hertz (Hz).

Nevertheless, in numerous applications working on a video signal, the refresh frequency of the overall image is higher than $F_0$. The advantage of a higher frequency is to reduce the effects of image flicker, thereby improving viewing comfort by being less tiring for the eye.

In this example of time-sequenced scanning, if F is the frequency for the overall image, then the refresh frequency for each sub-image $I_N$ is equal to N×F.

This amounts to saying that for each sub-image, the individual refresh frequency of a sub-image needs to be not less than $N \times F_0 = N \times 25$ Hz, and if it is desired to reduce image flicker, then not less than N×50 Hz, N×100 Hz, or N×75 Hz, with reference to the frequencies used in television applications, being 50 Hz or 100 Hz, or computer applications, being 75 Hz.

Below, it is assumed that N is equal to two, corresponding to a mosaic made up of two sub-images that are adjacent in the horizontal direction.

Under such circumstances, and by way of example, if it is desired to create a final virtual image I of VGA quality, i.e. 640×480 pixels, then a miniature screen 2 is used having 320×480 pixels.

Figure 2B:
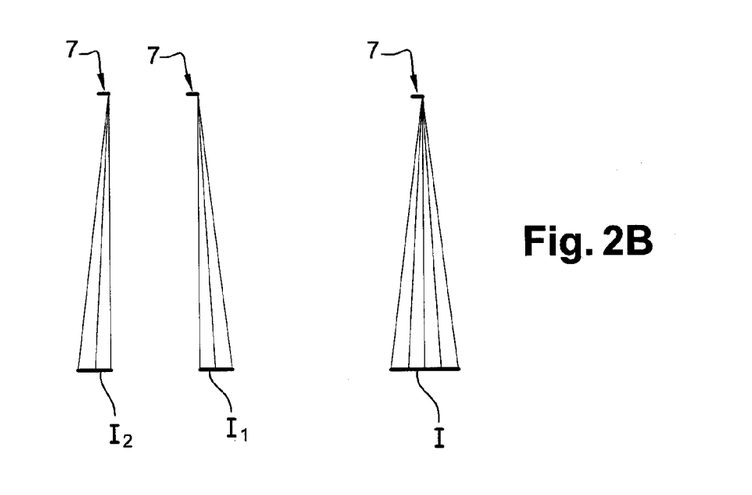
FIG. 2B shows a principle of image recombination in accordance with the invention, illustrated on the basis of light rays.

FIG. 2B traces light rays for forming a virtual image I by juxtaposing two virtual images $I_1$ and $I_2$. This figure shows the principle of the light ray path from a mosaicing device, enabling the sub-images to be juxtaposed side by side.

Figure 3A:
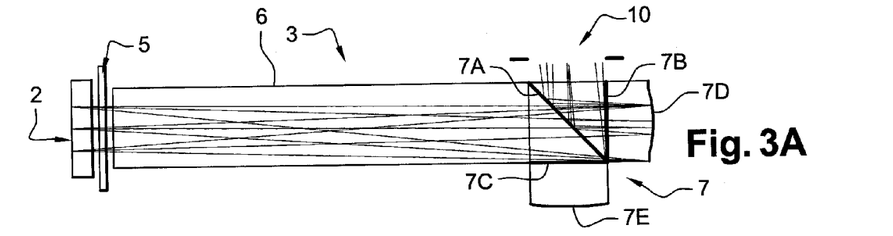
FIGS. 3A and 3B trace, rays along two mutually interlaced optical paths in an embodiment of the mosaicing device 3 in accordance with the invention, as seen from above.
Figure 3B:
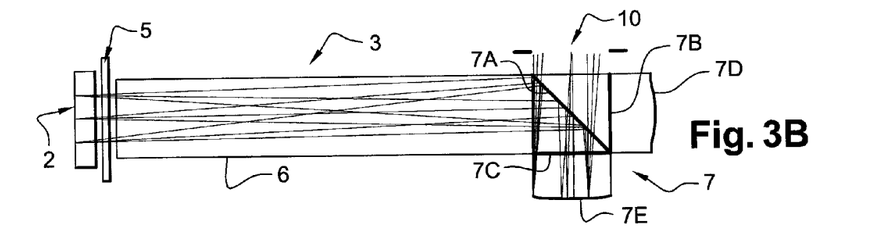

FIGS. 3A and 3B show an embodiment of the mosaicing device 3, enabling the above principle to be implemented.

The mosaicing device 3 is constituted by a polarization control element 5 controlling the polarization at its outlet so that it alternates substantially at the period τ between a P polarization and a S polarization, and associated advantageously with a light pipe 6 for propagating the light conveying the light beams towards a device 7 for spatially reconstructing images, which device spatially recombines the positions of said beams corresponding to the sub-images, through an exit pupil 10 going towards the light pipe 1.

The use of a light guide between the polarization control element 5 and the element 7 for spatial reconstruction of images is optional, but advantageous: it makes it possible to shorten the physical length of the light path and thus to make the system more compact. Advantageously, it may be given a rhombohedral shape, so as to embed it in the system for spatial reconstruction of images.

Thus, the light pipe 6 carries polarization separating treatment 7A that is inclined and associated with two quarterwave plates 7B and 7C with delay axes disposed at 45° to the incident P or S polarizations, and two Mangin mirrors 7D and 7E that are off-center relative to the optical axis.

The optical axis is defined as being the axis passing via the center of the useful image display zone of the miniature screen and perpendicular thereto. When the light path is folded, e.g. by using mirrors, for packing or other reasons, the term "optical axis" is considered by extension to cover any transformation of said straight line by said reflections on the mirrors.

In the embodiment shown, the separating treatment 7A that transmits the P polarization and reflects the S polarization is inclined at 45° relative to the optical axis and is disposed on the inclined face of the light pipe 6, and the two quarterwave plates 7B and 7C are perpendicular and located in register with said separating treatment, one plate 7B at the end of the light pipe 6 and the other on a longitudinal face thereof. Advantageously, the mirrors 7D and 7E are Mangin mirrors, thus making it possible to provide a self-supporting assembly using adhesive. The quarterwave plates are generally plastics films, so such an arrangement in which a quarterwave plate is adhesively bonded between two precision-surfaced optical surfaces presents the advantage of guaranteeing planeness.

The miniature screen 2 is optionally capable of emitting polarized light directly. If it is not capable of emitting polarized light, then a polarizer is added to its emission face.

The polarization control element 5 serves to modify the polarization of the light coming from the miniature screen and to transform it into P or S polarization, with reference to the angle of incidence on the separating treatment 7A.

The operating principle is as follows: by means of the polarization control element 5, the polarization coming from the miniature screen 2 is transformed so as to alternate between P polarization and S polarization.

When P polarization is selected, as shown in FIG. 3A, the light passes through the separating treatment 7A and then impacts the quarterwave plate 7B of the PS path. This plate is disposed with its axis at 45° to the reference polarization direction P. The light exiting the quarterwave plate 7B is thus circularly polarized. It is then reflected on the mirror 7D of the PS path and passes back through the quarterwave plate 7B of the PS path. After this passage, it is transformed into polarization that is rectilinear but in a direction that is perpendicular to its initial direction: it is thus incident on the separating treatment 7A with S polarization and is therefore reflected by the separating treatment 7A towards the exit pupil 10 of the mosaicing optical system. This path for the light beam is referred to below as the PS path.

Conversely, when the S polarization is selected by the polarization control element, as shown in FIG. 3B, the light is reflected on the separating treatment 7A and then impacts the quarterwave plate 7C of the SP path. This plate is disposed with its axis at 45° to the reference direction of the S polarization. The light leaving the quarterwave plate 7C is thus circularly polarized. It is then reflected on the mirror 7E of the SP path and passes back through the quarterwave plate 7C of the SP path. After this passage, it is thus transformed into polarization that is rectilinear but in a direction that is perpendicular to its initial direction: it is therefore incident on the separating treatment 7A with P polarization and is thus transmitted through the separating treatment 7A towards the exit pupil 10 of the mosaicing optical system. This light beam path is referred to below as the SP path.

In order to create two images that are offset relative to each other, the centers of rotation of the Mangin mirrors 7D of the PS path and 7E of the SP path are offset from the optical axis by an amount equal to half the size of the working zone ZU of the image of the miniature screen 2, each being offset in a different direction. These mirrors are shown in deployed manner in FIG. 4.

Figure 4:
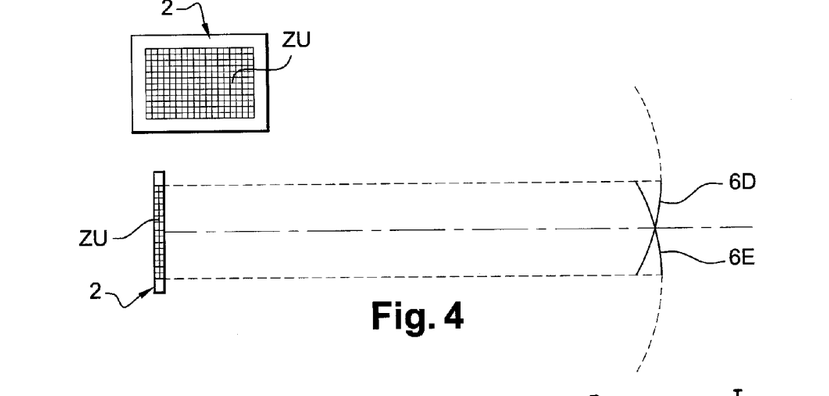
FIG. 4 is an unfolded view showing the principle whereby the mirrors shown in FIGS. 3A and 3B are off-center.

In this way, each path generates a sub-image that is offset by exactly half the size of the working zone.

Advantageously, the outlet pupil 10 of the system corresponds to the entry viewport or entry pupil $L_E$ of the light guide 1.

In practice, since it is not possible to fabricate a system that is perfect, the offsetting of the two mirrors is not exactly the same in absolute value nor exactly equal to a value that is set and known in advance as being equal to half the size of the miniature screen 2.

This is due to errors in component fabrication. Nevertheless, these errors can be brought within a tolerance range for each individual part and can be given overall consideration at system scale.

Figure 5A:
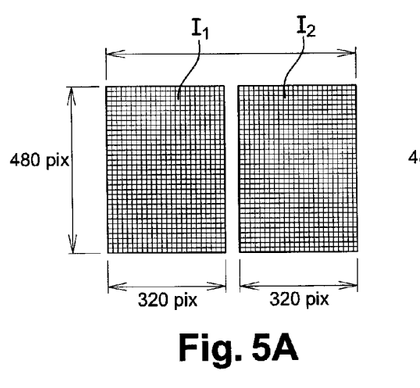
FIGS. 5A and 5B are views showing defects generated by such fabrication errors in a resulting virtual image.
Figure 5B:
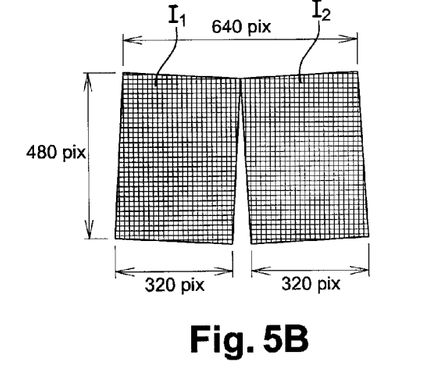

The defects generated by these fabrication errors can be as follows:
 the two sub-images can be caused to be disjoint in the center of the mosaic image, as shown in FIG. 5A; and
 each sub-image can have its own different rotation, as shown in FIG. 5B.

Figure 6A:
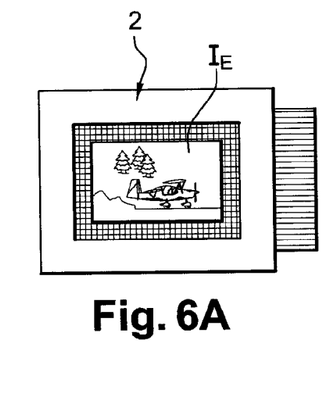
FIGS. 6A and 6B are face views of a miniature screen in accordance with the invention.

In order to correct these defects, a miniature screen 2 is used in which the size of the zone containing pixels for use in displaying an image is greater than the size of the screen image $I_E$ that is actually generated, as shown in FIG. 6A.

Figure 6B:
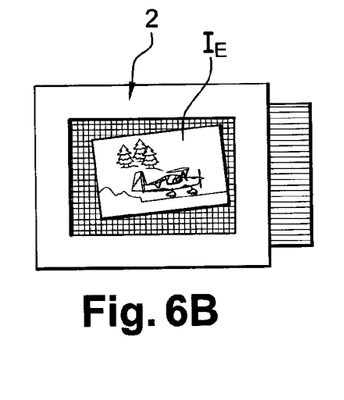

The additional pixels are used for moving the image zone over the active surface, as shown in FIG. 6B: thus, the screen image $I_E$ generated by the miniature screen 2 is moved in translation and/or rotation without physically moving the screen itself.

Figure 7:
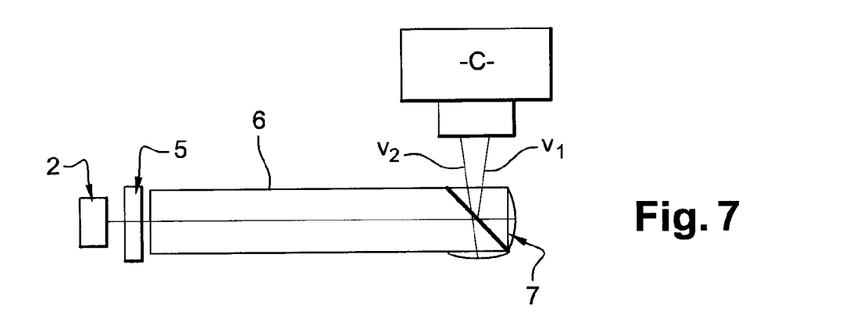
FIG. 7 shows an adjustment bench in accordance with the invention.
Figure 8:
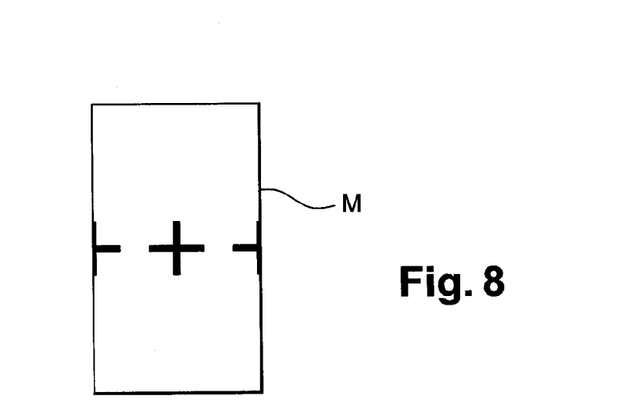
FIG. 8 shows a test pattern seen by the camera of the adjustment bench in accordance with the invention.

The offset and the rotation of the display of the screen image are controlled by the driver electronics of the miniature screen 2. They are calculated so as to compensate for the disjoint and rotation effects induced by fabrication defects. A simple adjustment procedure on a test bench can be used to determine these parameters, as shown in FIG. 7. Using a camera C to observe the image given at the exit from the element 7 for optically reconstructing images spatially, enables the two resulting sub-images to be captured. Each sub-image is caused to display a resetting test pattern M, as shown in FIG. 8. By way of example, this pattern M comprises three crosses, a left edge cross, a right edge cross, and a center cross.

Thereafter, the pattern M displayed in a center position on the active zone is exposed on a common camera image, firstly as imaged via the PS path $v_1$ of the element 7 for spatial reconstruction of images, and then via the SP path $v_2$ of the element 7 for spatial reconstruction of images.

The characteristics of the resetting camera C must be known, in particular its transverse magnification in the configuration used. This magnification value is easily determined by the person skilled in the art. Optionally, consideration could be given to vertical transverse magnification and to horizontal transverse magnification that are not the same. Nevertheless, in practice, then the camera is of good quality, these too are very similar and can be considered as being equal. This magnification is written GyCAM. It expresses the ratio between the size of the image of a pixel on the miniature screen 2 in the detector plane of the camera C and its real size.

If pitch_µd is used to designate the real size of a pixel of the miniature screen 2 and pitch_cam is used to designate the real size of a pixel of the camera C, it is possible to define a "pixel magnification" between the screen image displayed on the miniature screen and its image detected by the camera, as follows:

$$G\_pixel = pitch\_\mu d \times GyCAM / pitch\_cam$$

This value represents the size of the image of a miniature screen pixel when expressed in terms of camera pixels.

It needs to be calibrated by methods that are known to the person skilled in the art.

Figure 9A:
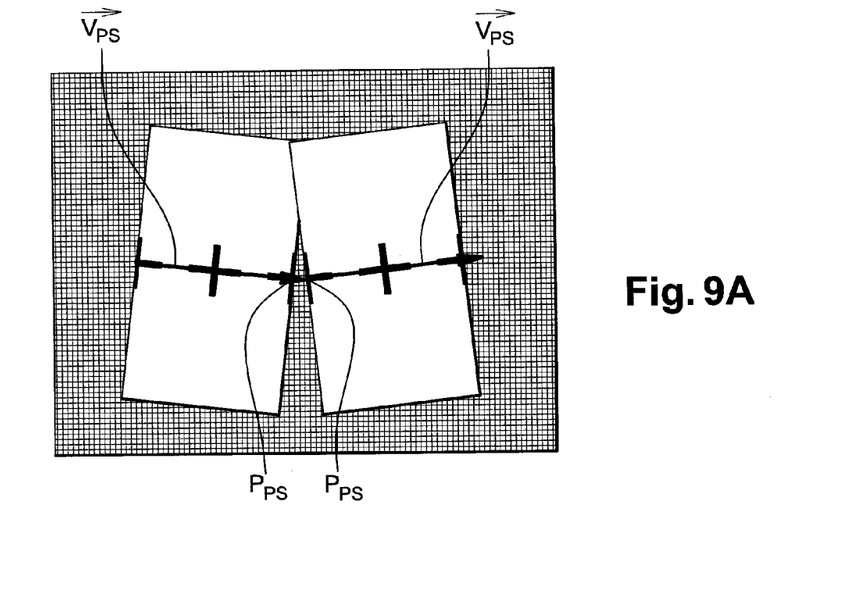
FIGS. 9A and 9B are views of a virtual image taken by the camera of the adjustment bench, showing the processing for resetting sub-images.

This produces an image on the camera, as shown in FIG. 9A.

One method of resetting the images may be as follows.

Starting from the images of the SP and PS paths, the point $P_{SP}$ is defined as being the image on the camera of the cross closest to the PS image and vice versa for the point $P_{PS}$. In order to reset these two images, it suffices to bring the points $P_{SP}$ and $P_{PS}$ into coincidence and to make the vectors $V_{SP}$ and $V_{PS}$ colinear.

By capturing the centers of the three crosses (left edge cross, right edge cross, and center cross) either manually or by automatic detection, it is possible to define the horizontal vectors for the PS and SP images respectively, in the frame of reference constituted by the pixel coordinates of the image in the acquisition camera C.

The horizontal vector of a sub-image is defined as being the vector interconnecting the left edge cross and the right edge cross.

The angle of each of these vectors relative to the horizontal axis of the frame of reference constituted by the pixels of the camera can then be calculated simply. These angles are written α_SP and α_PS.

Thereafter, for each SP and PS sub-image, the positions of the points $P_{SP}$ and $P_{PS}$ are calculated, which positions are written (x_SP, y_SP) and (x_PS, y_PS) in the coordinate space of the image.

One proposed method is to reset the point $P_{PS}$ on the point $P_{SP}$, and to modify the horizontal vector $V_{PS}$ so as to make it colinear with the horizontal vector $V_{SP}$.

This is performed by rotating through an angle ($\alpha\_SP$-$\alpha\_PS$) about the point $P_{PS}$, and then moving in translation by the vector (x_SP-x_PX, y_SP-y_PS), which is finally calculated in the space of the miniature screen 2. Depending on the signs of the magnifications of the optical system formed by the miniature screen 2 and the element 7 for spatially reconstructed images, and of the camera C, the mathematical expression may have a variety of forms, but they always reduce to combining rotation about either the left edge cross or the right edge cross through an angle:

$$\pm(\alpha\_SP\text{-}\alpha\_PS)$$

together with translation by a vector $$V=\pm(x\_SP\text{-}x\_PX, y\_PS\text{-}y\_PS)/G\_\text{pixel}.$$

Figure 9B:
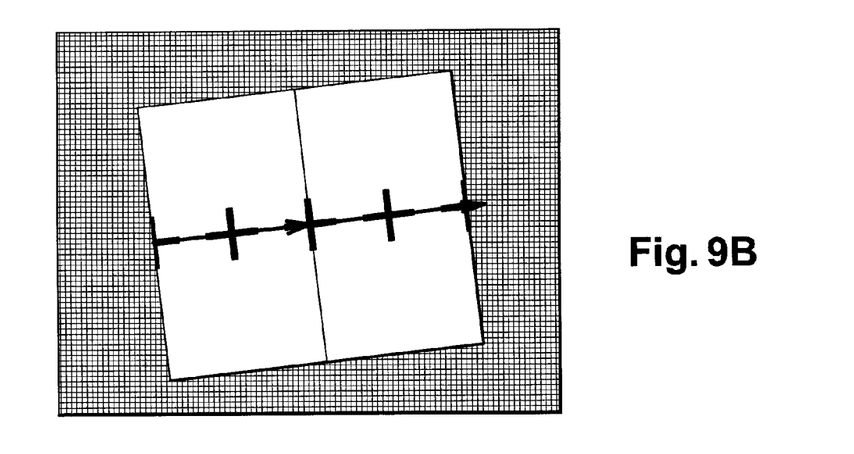

This produces an image supplied by the camera superposing the two sub-images from the reset SP and PS paths, as shown in FIG. 9B.

The precise tolerances of the optical system enable the width of the active zone on the miniature screen relative to the desired image size to be sufficient for it to be possible under all circumstances to reset the SP image relative to the PS image.

Other types of resetting can be used, including making the new common axis represented by the horizontal vector $V_{PS}$ and the horizontal vector $V_{SP}$ parallel to the horizontal pixel axis of the camera C or to an external reference horizontal axis associated with the eyeglass frame and identified by any appropriate method, or indeed an axis that is horizontal when the information lens is being worn, and again identified by any appropriate method.

This implies calibrating the camera so that the axis is representative in the final system.

Figure 10:
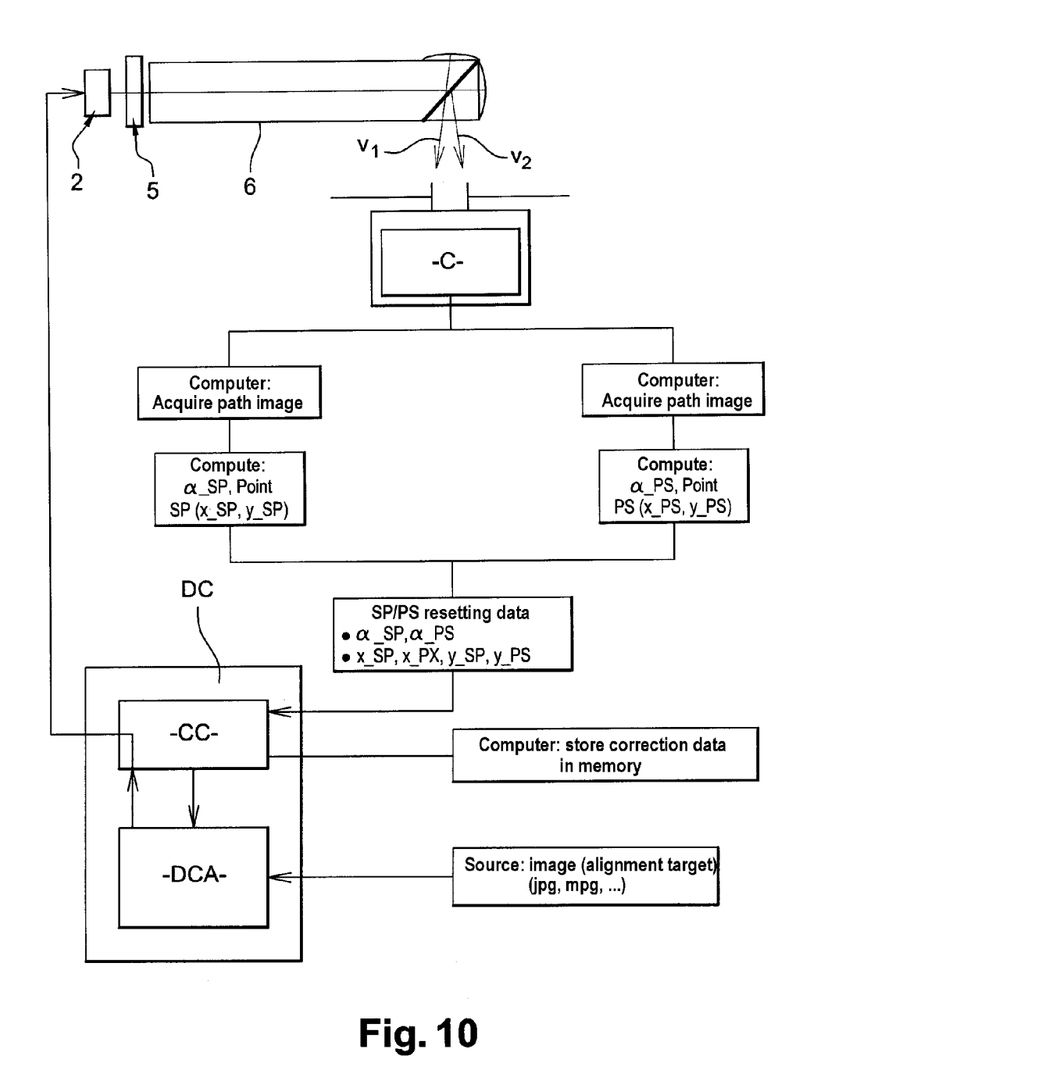
FIG. 10 shows the sub-image resetting method in accordance with the invention.

This step of resetting the images of the SP and PS paths is performed during a calibration step making use of a suitable optical and electronic bench, as shown in FIG. 10.

The electronic control device DC of the miniature screen receives in its display control device DCA an image from a source. This image is split into two sub-images that are addressed in equal manner.

A compensation circuit CC receives the resetting data as calculated by the computer from the resetting bench and that can be reset to zero electronically.

The compensation circuit CC corrects the sub-image data that is transmitted thereto by the display control device DCA and its sub-images as reset are emitted by the miniature screen 2.

Figure 11:
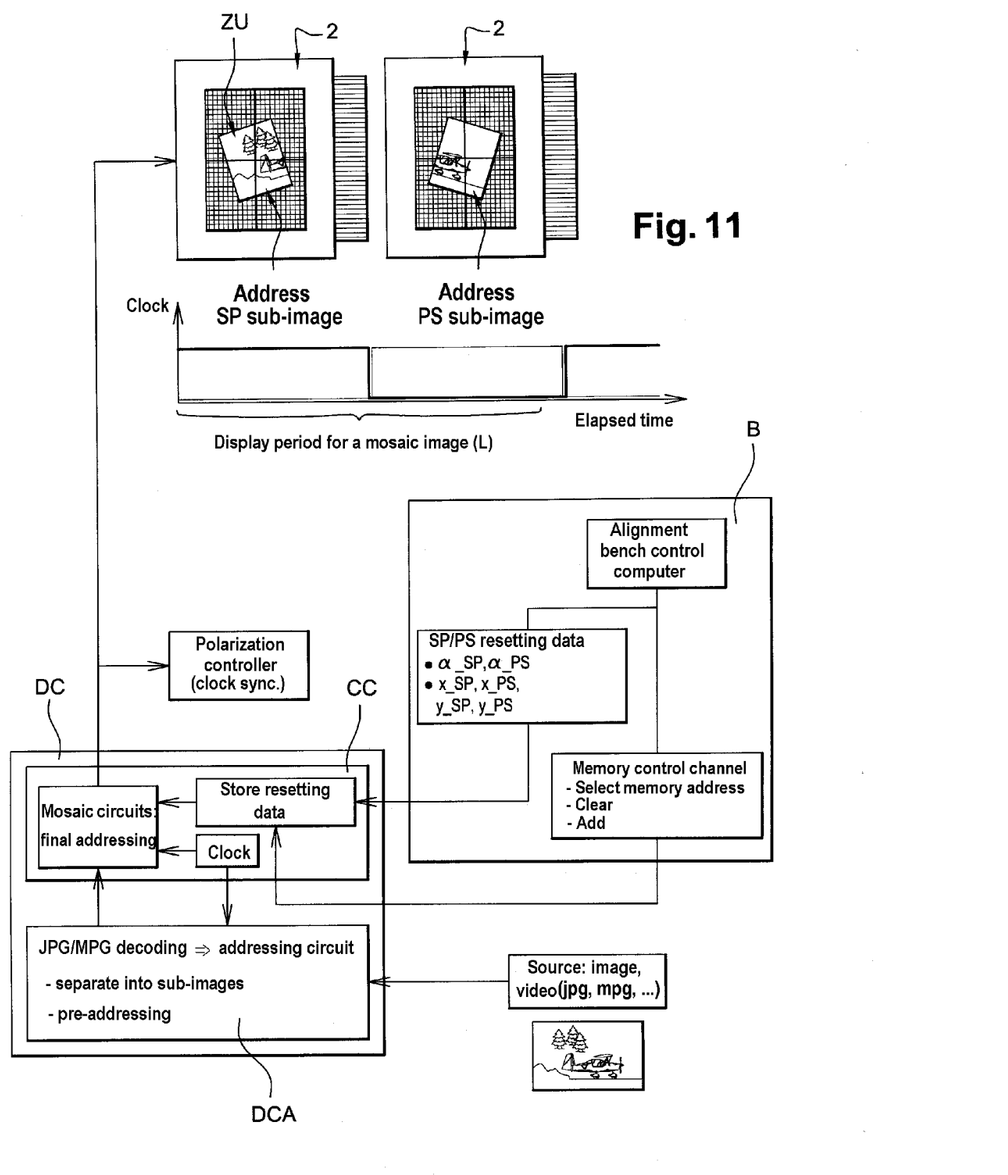
FIG. 11 shows the architecture of the electronics of a display arrangement in accordance with the invention.

FIG. 11 shows the general architecture of the electronics and the operating principle on which the sub-images are displayed on the miniature screen.

A source image is transmitted to the display control device DCA of the miniature screen control device DC. This source image is decoded, and subdivided into two sub-images that are also pre-addressed via a clock.

A compensation circuit CC of the control device has previously stored the resetting data from the resetting bench B and it transmits this data to the mosaicing circuits that receive the sub-images from the display control device DCA and that finalize their addressing via the clock.

Advantageously, the memories storing the sub-image resetting coordinates are redundant and have error correction systems in order to improve overall robustness.

The clock is synthesized with the control of the polarization control device 5 so that alternation between the P and S polarizations is synchronous with the time each sub-image is displayed.

The control device DC then resets each screen sub-image of display period shorter than the remanence time of the retina of the eye divided by two, the display period of the two screen sub-images being less than 1/50th of a second.

Figure 13:
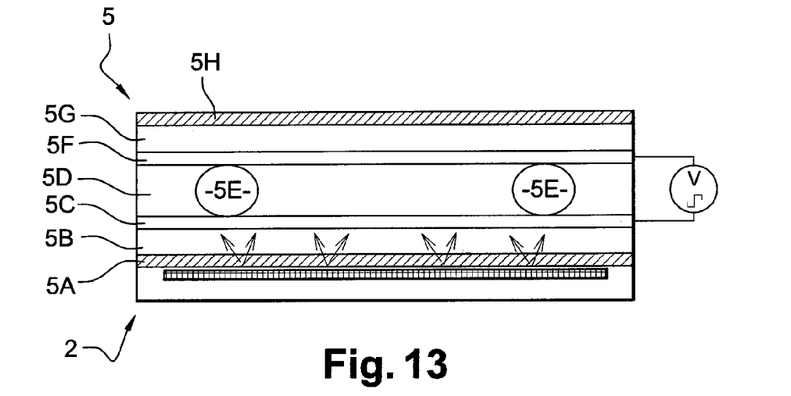
Figure 14:
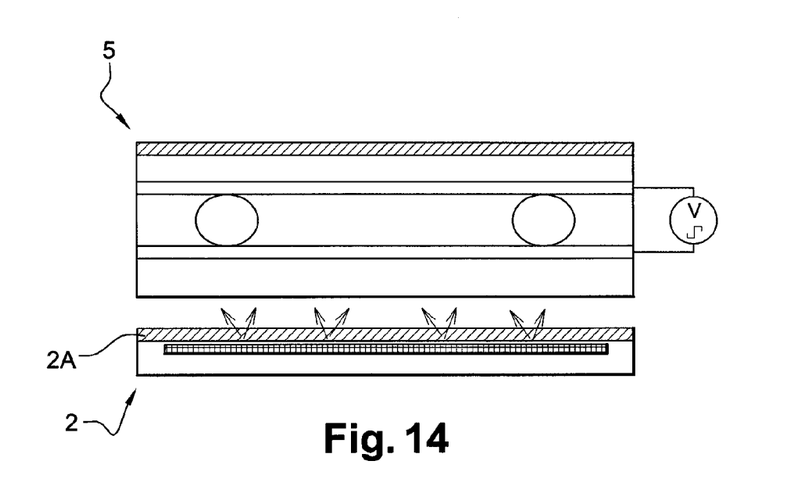

As also mentioned above, the mosaicing optical device 3 has a polarization control element 5 placed facing the miniature screen 2 and passing P polarization and S polarization in alternation, substantially with the period τ. Several embodiments of this device are shown in FIGS. 12 to 14.

The polarization control element 5 preferably comprises an electrically-controlled liquid crystal cell.

The miniature screen 2 may be of the type that produces non-polarized light, or of the type that produces polarized light.

Figure 12:
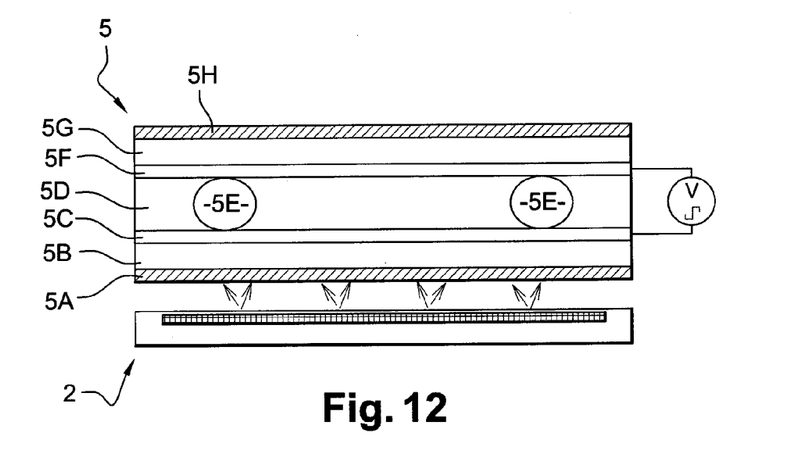
FIGS. 12 to 15 are cross-section views of variant embodiments, relating to the polarization control elements and to the display in accordance with the invention.

FIG. 12 shows a miniature screen 2 that produces non-polarized light.

The polarization control element 5 then comprises in superposition: a polarizer 5A, a first supporting glass plate 5B, a first indium-tin oxide plate 5C, a layer of liquid crystal 5D supported by spacers constituted by beads of glass 5E, a second indium-tin oxide plate 5F, a second supporting glass plate 5G, and optionally a protective coating 5H.

The liquid crystal cell is designed to produce a phase shift of 0 or π/2 as a function of the electrical control signal applied to the terminals of the indium-tin oxide plates.

At the output from the polarization control element 5, polarized light is obtained in two mutually perpendicular directions depending on the applied control voltage V.

Typically, in the present state of the art in the field of liquid crystals, it is possible to control the cell with voltages in the digital range (0 to 5 volts (V)). It can be considered that $V_{On}$=0 V, and $V_{Off}$=5 V are realistic values.

For example, when $V_{on}$ is applied via the polarization controller, the incident polarization is turned through 90°, and when $V_{off}$ is applied, the incident polarization remains unchanged.

The distance between the miniature screen 2 and the polarization control device 5 is as small as possible.

It is also possible to put these two elements into contact, as shown in FIG. 13.

These two elements are here in contact with each other and the size of the active zone of the polarization control device 5 is then equal to the size of the active zone of the miniature screen 2 generating sub-images, with a suitable tolerance safety margin.

The advantage of putting the two elements into contact is to make the system more compact.

The polarizer 5A shown in FIGS. 12 and 13 may originally be on the miniature screen 2 instead of being on the polarization control element 5, without harming overall operation.

FIG. 14 shows a miniature screen 2 that delivers polarized light.

It is constituted by a liquid crystal display (LCD) screen that is selected from the various architectures that are well known to the person skilled in the art. The polarizer 2A is therefore of no use for the polarization controller since it already exists on the screen.

Since the most difficult step is aligning the polarizer 2A with the liquid crystal axis of the cell of the polarization device 5, it is appropriate to fabricate a single assembly comprising the LCD screen 2 and the polarization control device 5, where such fabrication can be performed on a single production line, one after the other and using the same technologies.

Figure 15:
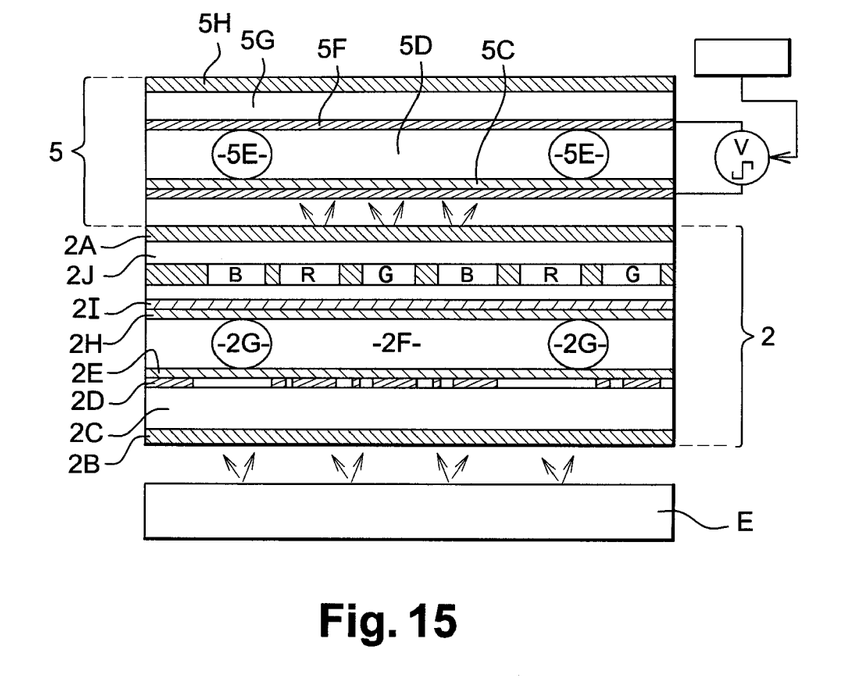

Such a variant embodiment with a miniature screen 2 having blue B, red R, and green G colored filters is shown in FIG. 15.

Facing an emitter E there is placed an assembly made up of a miniature screen 2 and a polarization device 5.

The screen 2 comprises a polarizer 2B, a glass slab 2C, a data row 2D, an alignment layer 2E, a liquid crystal layer 2F supported by spacers constituted by glass beads 2G, an alignment layer 2H, an indium-tin oxide plate 2I, the set of B, R, G color filters, a glass slab 2J, and a polarizer 2A.

The polarization device 5 is made as above, i.e. without a polarizer.

Figures 16, 17:
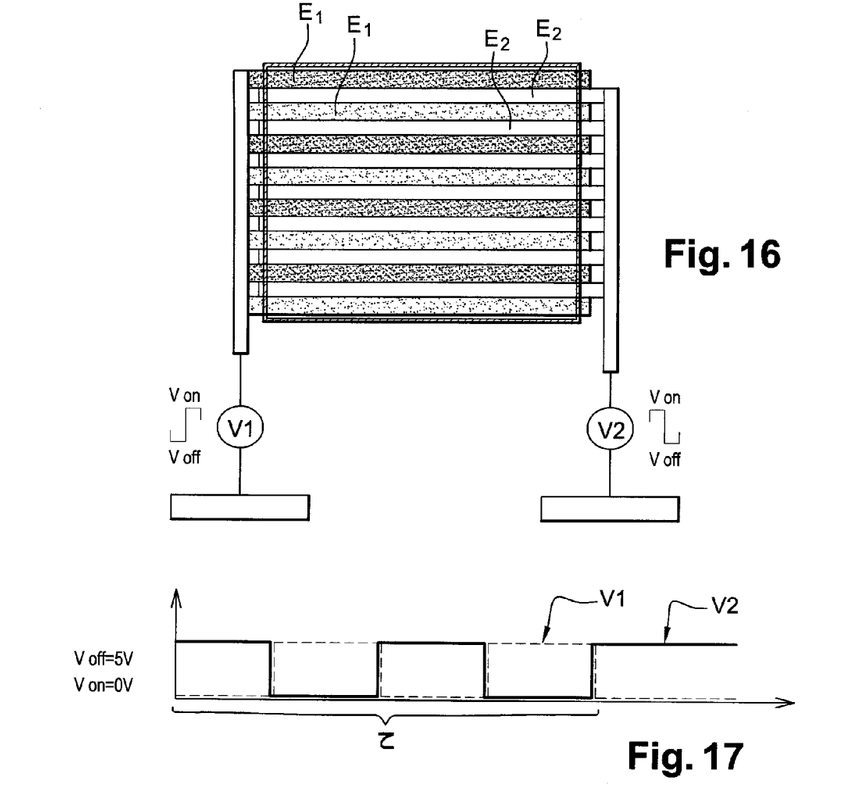
FIG. 16 is a plan view of the polarization control device in an improvement in accordance with the invention.
FIG. 17 is a graph showing how such an improvement is controlled.

An improvement may be provided that consists in forming an interlaced configuration on the polarization control device. This improvement is shown in FIGS. 16 and 17.

The above-described full-surface configuration has the advantage of being easy to make and therefore inexpensive.

Nevertheless, it can be particularly sensitive to flicker in the resulting image. The interlaced geometry is a little more complex to make but presents lower sensitivity to flicker.

The geometrical principle of interlaced electrodes on the polarization control device 5 consists in displaying simultaneously every other row or column on the SP path $v_1$ with the other series of rows or columns being displayed on the PS path $v_2$. There are thus two electrodes $E_1$ and $E_2$ in the form of two interlaced combs, as shown in FIG. 16. The branches of any one comb of electrodes are connected together by a common line that activates them simultaneously.

The electrodes are accurately aligned on the pixels of the miniature screen 2 that emits the sub-images.

The signals V1 and V2 are periodic squarewaves of frequency equal to the refresh frequency selected for the image. They alternate between $V_{on}$ and $V_{off}$ with equal durations on each of these two voltages. V1 and V2 are in phase opposition.

It should be observed that interlacing doubles the clock frequency.

The control voltages $V_1$ and $V_2$ applied to the terminals of the indium-tin oxide plates are shown in FIG. 17, where the direction of the polarizer 2A at the outlet from the miniature screen 2 that generates the screen sub-images is placed parallel to the incidence S of the cube including the separating treatment 7A of the device for spatially reconstructing images. The liquid crystal of the polarization control device 5 is a normally-white twisted nematic (TN) crystal. This gives $V_{on}=0$ V.

It is important to observe that when using a polarization control device with interlaced scanned, it is extremely important for the row or column electrodes $E_1$, $E_2$ to be aligned with the color pixels. For a miniature LCD screen having color filters, it can be advantageous to make use of appropriate sub-pixel structures, as shown in FIG. 18.

On the left of this figure, there is shown a first structure of red pixels $P_R$, green pixels $P_G$, and blue pixels $P_B$, disposed in alignment relative to the interlaced electrodes.

Figure 18:
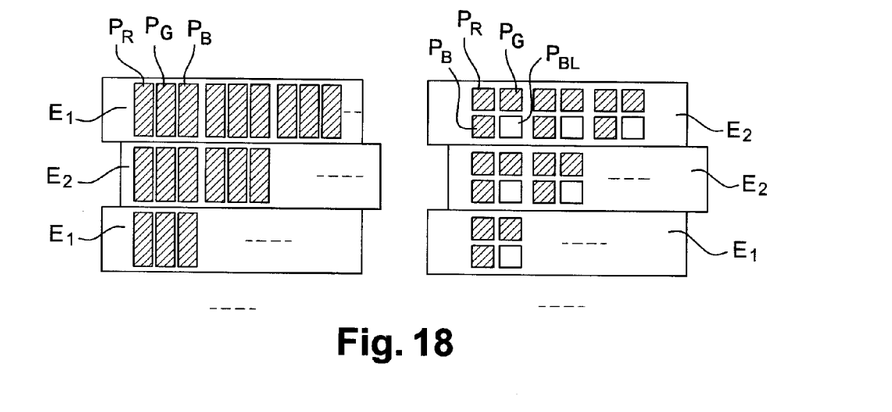
FIG. 18 shows two color pixel structures that are compatible with the invention.

On the right of FIG. 18, there is shown a second pixel structure including a white (blank) pixel $P_{BL}$ in each sequence of pixels organized as squares in alignment relative to the interlaced electrodes.

The invention is applicable equally well to monocular displays and to binocular displays.

Although the embodiment relates to an electronic display arrangement in which the control device of the miniature screen includes an arrangement for subdividing a source image into two screen images and a mosaicing device for conveying these two screen images in a manner in which they are mutually spatially offset and time shifted at a period that is shorter than the remanence time of the retina of the eye divided by two, with each screen image being conveyed towards the eye of the wearer for viewing a virtual sub-image, with the two resulting and adjacent virtual sub-images together forming said virtual image in full, the invention also applies to such an arrangement having N sub-images.

Under such circumstances, the element for spatially reconstructing the image has at least N mirrors, each offset by a different distance from a reference optical axis, defined as being the straight line coming from the center of said miniature screen and perpendicular to the plane of said screen, together with N polarization separating treatments and N wave division plates.

Said element for spatially reconstructing the image may be made of a set of prisms and/or rhombohedra, of spherical or aspherical mirrors, each offset by a different distance from the reference optical axis, of polarization separating treatments, and of quarterwave or halfwave plates.

Advantageously, said element for spatially reconstructing the image has as many offset spherical or aspherical mirrors as there are sub-images, i.e. N of them.

Advantageously these spherical or aspherical mirrors are mirrors of the Mangin type.

Alternatively, a second polarization control element may be added to the mosaicing device and positioned on the path of the light beams immediately after the element for spatially reconstructing the image.

The invention claimed is:

1. An electronic display arrangement for taking light signals forming an image emitted from a miniature screen and referred to as a screen image, and for conveying them to the eye of a user to enable a virtual image to be viewed, said arrangement comprising:
    a miniature screen control device having an arrangement for subdividing a source image into N screen images and in that it includes a mosaicing device having an exit viewport and serving to convey the N screen images in a manner in which they are spatially offset from one another and time shifted from one another at a period shorter than the remanence time of the retina of the eye divided by N, each screen image being conveyed towards the eye of the wearer for viewing a virtual sub-image, the N resulting and adjacent virtual sub-images together forming said virtual image in full, said mosaicing device having a light polarization control element and by an element for spatially reconstructing the virtual image, wherein said mosaicing device includes a light pipe of material that is transparent in the visible domain and in that said light pipe is disposed between said control element and said element for spatially reconstructing the virtual image.

2. An arrangement according to claim 1, wherein said mosaicing device is disposed between said miniature screen and the eye of the wearer.

3. An arrangement according to claim 1, wherein said element for spatially reconstructing the image comprises at least two mirrors each offset in a different position relative to a reference optical axis defined as being the straight line from the center of said miniature screen and perpendicular to the plane of said screen, at least one polarization separating treatment, and at least two quarterwave plates.

4. An arrangement according to claim 3, wherein at least one of said polarization separating treatments is a grid polarizer.

5. An arrangement according to claim 1, wherein at least one pupil-extending light guide including an entry viewport is placed between the mosaicing system and the eye of the wearer.

6. An arrangement according to claim 5, wherein said light guide is included in an ophthalmic lens.

7. An arrangement according to claim 5, wherein the exit viewport from the mosaicing system is placed in correspondence with the entry viewport of the light guide.

8. An arrangement according to claim 1, wherein N is equal to two and in that said polarization control element polarizes the light beams coming from the miniature screen alternately with a P polarization vector and an S polarization vector, substantially at said period.

9. An arrangement according to claim 8, wherein said light pipe carries inclined polarization separating treatment associated with two quarterwave plates with delay axes forming an angle of 45° relative to the direction of the P or S polarization vector in the plane of said quarterwave plates.

10. An arrangement according to claim 9, wherein the separating treatment is inclined at 45° relative to a reference optical axis defined as being the straight line from the center of said miniature screen and perpendicular to the plane of said screen, and the two quarterwave plates are perpendicular.

11. An arrangement according to claim 1, wherein said polarization control element comprises an electrically-controlled liquid crystal cell.

12. An arrangement according to claim 11, wherein said miniature screen and said polarization control element form a single part.

13. An arrangement according to claim 1, wherein said virtual sub-images are of an interlaced configuration.

14. An arrangement according to claim 13, wherein said polarization control element has interlaced electrodes.

15. An arrangement according to claim 1, wherein the miniature screen control device includes a device for resetting the positions of said screen images, said resetting being defined by calibration on an adjustment bench.

16. An arrangement according to claim 15, wherein said miniature screen presents a zone containing pixels displaying an image that is of a size greater than the size of the screen image that is generated thereon.

17. An arrangement according to claim 15, wherein a device for storing resetting coordinates in memory possesses redundancy and an error correction system.

18. An arrangement according to claim 1, wherein the miniature screen control device includes an arrangement for addressing said screen images.

* * * * *